Patented Jan. 10, 1933

1,893,499

UNITED STATES PATENT OFFICE

WILLIAM R. JEAVONS, OF CLEVELAND HEIGHTS, AND MAHLON J. RENTSCHLER, OF WILLOUGHBY, OHIO

PROCESS OF TREATING METALS

No Drawing. Application filed November 14, 1930. Serial No. 495,779.

This invention relates to the conditioning and purifying of molten metals and particularly of steel in the process of its production.

It is well known in the art that, in the working of steel to commercial requirements, there is much production loss by reason of the inclusion and detrimental effect of impurities present in the congealed output.

The object of this invention is to remove detrimental impurities from the steel during the process of its production to the end of eliminating production loss as well as to contribute to the quality of the product.

Broadly, the object of our invention is to oxidize the impurities in the molten metal and slag out the oxidized impurities.

In carrying out our method, it is essential that nascent oxygen be employed for oxidizing the impurities, and a potent flux is necessary to slag off the oxidized impurities.

We find that barium peroxide, if properly conditioned, will emit nascent oxygen under high heat and that the residue (nascent barium oxide) is a most potent flux for slagging off the oxidized impurities.

In carrying out our invention with the use of commercial barium peroxide, which is an incoherent white powder and contains from 5 to 10 percent of barium oxide, the barium peroxide is moistened with cold water and compressed into an integrated body; the hydration of the barium oxide content by the moisture acts as a firm binder to cement the particles of barium peroxide into a hard solid mass of great density. This integrated body may be furher protected against abrasions by an envelope or casing; or the mixture of barium peroxide, barium oxide and water, may be directly compressed into metallic or other protecting casings, this latter procedure being preferred, as it more fully protects the integrated body from rough handling in shipping and mill practice.

The cartridges of conditioned barium peroxide are introduced into the bath of melted metal to be treated in the same manner as other furnace charges or ladle additions are made. By reason of the integrated condition of the barium peroxide, it immediately sinks to contact with and is partially submerged in the melted metal, the gravity of the conditioned barium being about 5 and the molten steel about 8; and also by reason of the low heat conductivity of barium peroxide in this integrated condition, its interior is protected from immediate reaction, thus prolonging its period of re-activity in contact with the molten metal.

The amount of barium peroxide necessary per ton of steel will vary relative to the grade of steel treated—2 to 5 lbs. per ton are adequate for ordinary carbon steels.

To illustrate the manner in which our invention operates, when barium peroxide is heated to about 1200° F. it gives off nascent oxygen according to the equation:

$$BaO_2 = BaO + O$$

The products of this reaction in the bath of melted metal react as follows:

Hydrogen is oxidized to water which escapes as steam or combines with the barium oxide to form barium hydrate and is slagged off.

Carbon monoxide is oxidized to carbon dioxide and escapes as such or reacts with the barium oxide to produce barium carbonate which slags off.

Sulphur is oxidized to sulphur dioxide which escapes or combines with barium oxide to produce barium sulphite or sulphate, which is removed in the slag.

Phosphorus is partially or wholly oxidized so that it combines with barium oxide to produce oxy-phosphorus salts of barium which are slagged off.

Partially oxidized metallic impurities of the bath such as ferrous oxide, manganous oxide, etc. are converted by the nascent oxygen to the higher oxides of these metals in which form they combine readily with the nascent barium oxide to produce such compounds as barium ferrate, barium manganate, etc., which rise to the surface and are removed with the slag. Impurities which are commonly detrimental to steel, such as silica, aluminia, lime, magnesia, etc., are combined with the nascent barium oxide to produce easily fusible slags which rise to the surface and are removed in a melted condition. In cases where the impurities are already partially oxidized, the barium oxide need not necessarily be in a nascent condition (in the sense that it must be produced in situ), provided that it be in a porous, friable condition, which will enable it to be disintegrated for extensive distribution throughout the metal, as described in our application Serial No. 535,568, filed May 6, 1931. Thus it will be seen that our process effects a cleansing action in the bath of melted metal which results in the removal of gases and solid matters which are detrimental and produces at the same time purer metals which have a greater density and more uniform structure.

Having thus described our invention, what we claim is:

1. The method of treating a molten metal for removal of impurities which comprises introducing into the same, one or more integrated masses composed of barium peroxide bound together with barium hydrate, said masses being of lower density than said molten metal and of considerable size whereby to sink far enough below the surface to aid materially in diffusion of the nascent oxygen and barium oxide through said metal by the action of evolved gases.

2. The method of purifying molten metal which consists in introducing thereinto an integrated mass composed of two alkaline earth metal compounds, one of said compounds adapted upon being introduced into said molten metal to yield two nascent fluxing agents and the other adapted normally to serve as a binder for the first and upon being introduced into said molten metal to yield a fluxing agent and lose its binding properties, said compounds being barium peroxide and barium hydrate.

3. The method of treating a molten metal for removal of impurities which comprises introducing into the same, one or more integrated masses composed of barium peroxide bound together with barium hydrate, said masses being of lower density than said molten metal and of considerable size whereby to sink far enough below the surface to aid materially in diffusion of the nascent oxygen and barium oxide through said metal by the action of evolved gases, said masses being enclosed in metallic casings.

In testimony whereof, we hereunto affix our signatures.

WILLIAM R. JEAVONS.
MAHLON J. RENTSCHLER.